Oct. 28, 1941.          F. GRAY          2,260,709
                    TELEVISION SYSTEM
                  Filed March 4, 1936          2 Sheets-Sheet 1

INVENTOR
F. GRAY
BY
C. H. Sprague
ATTORNEY

Patented Oct. 28, 1941

2,260,709

UNITED STATES PATENT OFFICE 2,260,709

TELEVISION SYSTEM

Frank Gray, New York, N. Y., assignor to Bell Telephone Laboratories, Incorporated, New York, N. Y., a corporation of New York Application March 4, 1936, Serial No. 67,060

24 Claims. (Cl. 178—7.2)

This invention relates to electro-optical systems, and more particularly to a method of and means for scanning a field of view or subject at a transmitting station to set up image currents representative of the various light-tone values of the subject, as in television.

An object of this invention is to produce improved means for scanning as, for example, in television systems, by controlling the production of a current which varies directly with the light-tone values of a field of view or subject.

Another object is to provide a novel scanning device containing a means for storing charges so that a greatly increased image current is formed.

A further object is to alternately control the operation of a plurality of scanning devices so that they respectively operate to control the supply of an image current to the external circuit during alternate image cycles.

In accordance with one embodiment of this invention, the apparatus includes two scanning devices, each comprising a gas-tight container enclosing a target or screen comprising a transparent plate, one face of which is provided with a layer of photo-emissive material, and, spaced a very small distance from said target, a storage member comprising a very thin transparent insulating plate having a thin non-conducting photo-emissive coating on a surface adjacent the transparent plate and a film of transparent conductive material on its other surface. The photo-emissive layer of the target and the conductive film of the storage member in the respective scanning devices are adapted to be connected to an external circuit including a resistance. A suitable source of potential applies charges of opposite polarity to the photo-emissive layer and the conductive film of each device. The charges applied to the photo-emissive layer and conductive film of one device are of opposite polarity to those applied to the corresponding members of the other device, and means is provided for reversing the polarity of all of the charges during alternate operating or image cycles.

During one operating or image cycle, the photo-emissive layer of one scanning device is made negative and the conductive film of this device is positively polarized whereas the photo-emissive layer of the second device is positively polarized and its conductive film is made negative. Radiations from the complete field of view are projected through the transparent plate of the first device onto the photo-emissive layer carried by this plate. Elemental areas of the layer are thereby activated to cause the emission of electrons corresponding to the lights and shades of elemental areas of the field of view, and these electrons pass to the adjacent photo-emissive coating on the proximate face of the insulating plate and are held there by virtue of the positive charge applied to the conducting film on the remote face of the insulating plate. At the end of this operating or image cycle, a reversing means is actuated to reverse the polarities applied to the photo-emissive layers and the conductive films of the respective devices. The photo-emissive layer of the first device is now positively polarized and its conductive film is negatively polarized. A moving beam of radiations now scans successively the unit areas of the photo-emissive coating of the insulating plate to thereby successively cause emission of the electron charges stored in this coating to the photo-emissive layer on the transparent plate, which layer is positively polarized during this image cycle. This emission controls the flow of an image current, which varies directly with the tone values of the elemental areas of the field of view, through the external circuit and hence through the resistance included therein which resistance is connected to a transmission circuit. During the first image cycle while the first device is storing electrons, the second device is discharging electrons stored in the preceding image cycle. During the next image cycle the first device is discharging while the second device is charging electrons. This operation is repeated during successive image cycles, so that the devices alternately control the supply of an image current to the external circuit.

Associated with the scanning devices are means for reversing the polarities applied to the respective photoelectric layers and conductive films of the devices in alternate image cycles, means for simultaneously directing radiations from the complete field of view to the scanning devices, means for producing moving beams of radiations to scan the photo-emissive coatings in the respective scanning devices together with a means for cutting off a beam of radiations from the respective scanning devices in alternate image cycles. All of the above-mentioned means are preferably synchronously controlled. In another embodiment of this invention, the reversing of the charges applied to the conductive elements of a single scanning device, such as described above, is accomplished by means of a high frequency voltage introduced in the circuit between these elements so that the potential reverses several times while the beam is passing over an elemental area. This discharge of electrons which controls the flow of the image current in the external circuit occurs in high frequency pulses so that one cell produces what may be considered as a continuous flow of image current.

A detailed description of the invention follows and is illustrated in the attached drawings, in which.

Figures 1, 4, 5, 6:
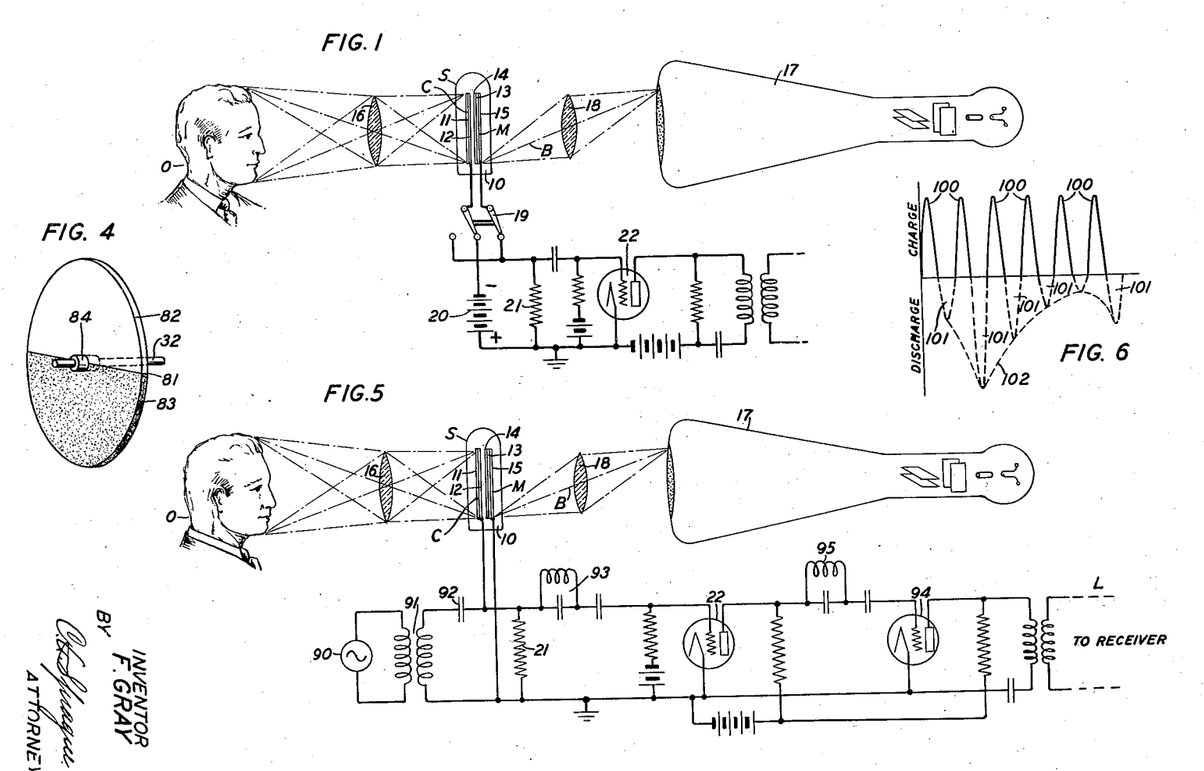
Fig. 1 shows an apparatus for producing a television image current.
Fig. 4 is a perspective view of one of the light shutters or screens used in Fig. 2.
Fig. 5 shows a circuit for reversing the potentials of the conducting members in a scanning tube by means of a high frequency alternating current.
Fig. 6 is a diagrammatic representation to aid in explaining the operation of the circuit arrangement of Fig. 5.

Referring more particularly to the drawings, Fig. 1 shows a television transmitter operating in accordance with the principles involved in this invention to control the production of an image current. An important part of the transmitter is a scanning device or tube S which comprises a gas-tight container 10 enclosing a target or screen C which comprises a transparent plate 11 which is surfaced with a photo-emissive conducting layer 12, and a storage member M which comprises a very thin transparent insulating plate 13 having a non-conducting photo-emissive coating 14 which faces the plate 11 and a transparent conducting film 15 on its surface remote from the plate 11. The members C and M are so mounted that there is a very small space between the photo-emissive layer 12 and the photo-emissive coating 14. For the sake of clarity the photo-emissive member 14 will be designated a "coating" and the photo-emissive member 12 will be called a "layer." An image of the field of view or subject O is focussed by an optical system, represented generally as the lens 16, upon the photo-emissive layer 12, and a moving beam of radiations B from a suitable source, such as the spot of light given off by the fluorescent screen of a cathode ray tube 17, scans the photo-emissive coating 14 through a lens system indicated generally by the single lens 18. A more detailed description of the scanning tube S will be given below with reference to Fig. 3.

The photo-emissive conducting layer 12 is connected to the transparent conducting film 15 by a circuit including a potential reversing device 19, a battery 20, and a resistance 21 in series with each other. While the potential reversing device 19 is shown as a hand-operated reversing switch in order to simplify the description of the apparatus, it is to be understood that, in a preferred embodiment, a motor-driven commutator is used to effect the necessary reversals.

For the purpose of illustration, let it be assumed that an image of the object O, which may be an animate object, an outdoor study, or a motion picture film, is focussed by the optical system 16 upon the photo-emissive layer 12, switch 19 is thrown to the right to negatively polarize the photo-emissive conducting layer 12 and to positively polarize the transparent conducting film 15, and the scanning beam supplied by source 17 is temporarily cut off. Photoelectrons emitted from the photo-emissive layer 12, due to its activation by radiations from the object, will pass almost directly across to the adjacent photo-emissive coating 14 of the insulating plate 13 and be held there, because of the high capacity between this coating and the positively polarized conducting film 15 on the opposite surface of the insulating plate 13. As a result, charges will be stored in elemental areas of the non-conducting photo-emissive coating 14 of the insulating plate 13, the value of such charges being respectively proportional to the intensity of the reflected radiations and hence to the tone values of respective elemental areas of the image O. If the switch 19 is now moved to the left to positively polarize the photo-emissive layer 12 and to negatively polarize the transparent conducting film 15, and the scanning beam B from source 17 is caused to sweep the photo-emissive coating 14, the unit areas of this plate will be successively scanned to cause the electrons stored on the respective elemental areas of this coating to be released. Due to the positive polarization of layer 12 in this image cycle, the electrons successively released from the unit areas of the coating 14 will flow to the corresponding unit areas of layer 12, to control the flow of successive image impulses and hence the flow of an image current through the external circuit including a resistance 21 which is included in the input circuit of an amplifier 22. By providing a scanning beam of much greater intensity than that of the radiations reflected from the subject to any elemental area of the photo-emissive layer 12, the multitude of charges stored in the photo-emissive coating 14 are released, one elemental area at a time, to the photo-emissive layer 12 and thereby cause a succession of current impulses of large amplitude, and hence a magnified image current, to flow through the resistance 21 and be impressed upon the input electrode of amplifier 22.

Since the apparatus described above is operative to supply image current to the transmission circuit during one operating cycle and is inoperative for this purpose during a succeeding period of equal duration, the line time of the system is reduced to fifty per cent, or, in other words, the line is only in use during half the time the system is in operation. This undesirable condition may be avoided by using the system shown in Fig. 2, which comprises a transmitting station including two image current producers of the type shown in Fig. 1, and means for controlling the image current producers in such manner that they respectively supply image current to the transmission circuit in succession and in such time relation that each supplies an image current during the idle period of the other.

Figures 2, 3:
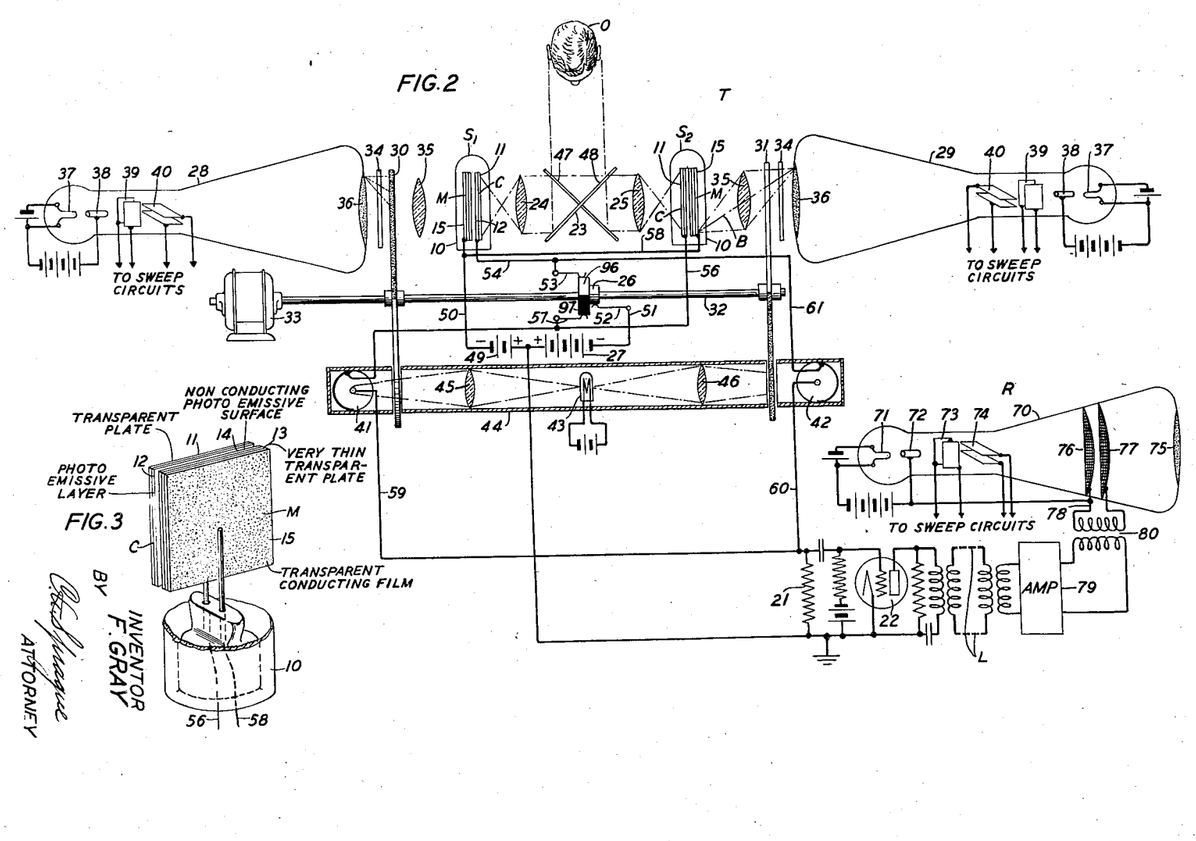
Fig. 2 is a diagrammatic representation of a more complete television system including the invention.
Fig. 3 is an enlarged perspective view of the assembly included in one of the scanning tubes shown in Fig. 2.

The system illustrated in Fig. 2 comprises, in general, a transmitting station T connected by a transmission medium L to a remote station including a receiver R.

The transmission station includes two scanning tubes S₁ and S₂, similar to the tube S shown in Fig. 1, which are alternately operated, so that, during a period of time corresponding to one image cycle, one tube is used to store up charges while the other tube is being scanned with a moving beam of radiations to cause charges previously stored therein to be discharged to the transmission circuit to control the production of an image current.

Associated with the tubes $S_1$ and $S_2$ is an optical system, comprising crossed, half-silvered mirrors 23 and lenses 24 and 25 for respectively directing radiations from the subject O to the targets of the two tubes $S_1$ and $S_2$. The optical arrangement shown by the crossed mirrors 23 comprises a mirror 47 and a mirror 48 crossed at right angles to each other and preferably arranged so that the center line through the object O and also the center line through the lenses 24 and 25 bisect the right angles between the two mirrors. These mirrors 47 and 48 are thinly coated with silver so that a portion of the rays are reflected and a portion passes through each mirror to be reflected by the other mirror.

Also associated with the scanning devices or cells $S_1$ and $S_2$ is a controller system comprising in general a means for creating a difference of potential between the photo-emissive layer 12 and the conductive film 15 in each of the devices, the polarities of the layer and conductive film in one cell at any instant being respectively opposite to the polarities of the same members in the other cell, means for simultaneously producing moving beams of radiations for scanning the photo-emissive coatings 14 of the respective devices and for causing one beam to scan the coating in one of the devices while preventing the other beam from scanning the coating in the other cell, and means for connecting one cell to the external circuit while preventing the connection of the other cell thereto. The controller system also operates to reverse the operation of the above means in alternate image cycles.

A rotating commutator 26, cooperating with batteries 27 and 49, serves to control the application of the desired potentials to the conductive films 15 and conductive photo-emissive layers 12 of the cells $S_1$ and $S_2$. This commutator comprises two segments, a conducting segment 96 and an insulating segment 97, contact 53 which is connected to the layer 12 of scanning cell $S_1$ and to a photo-emissive cell or valve 42, contact 57 which is connected to the layer 12 of scanning cell $S_2$ and to a photo-emissive cell 41, and a contact 52 which is connected to the negative terminal of battery 27 and which is always connected to the conducting segment 96 of the commutator. The commutator is mounted on a shaft 32 which is driven by a motor 33. The battery 27 has a larger potential than the battery 49 and the connections from these batteries are such that the small battery 49 is connected between layer 12 and conductive film 15 of the cell that is charging, the two batteries being connected together in opposition and this difference in potential applied between the layer 12 and conductive film 15 of the cell that is discharging. The commutator 26 operates to reverse these connections in alternate image cycles.

Another portion of the control system is the optical system for producing moving beams of radiations to respectively scan successively the elemental areas of the insulating plates 13 of these tubes. Any well-known method of producing a moving beam of radiations may be used such as, for example, a source of radiations co-operating with a circular disc having a spiral of apertures near its periphery, or the fluorescent screen of a cathode ray tube. While the latter is described below as a preferred means for producing a moving beam of radiations for use with this invention, it is to be understood that the former method or any other means for producing a scanning beam may be used instead.

The cathode beam in each of the tubes 28 and 29 is deflected in two directions at right angles to each other and at such relative speeds in the two directions that each fluorescent screen 36 is excited to produce a moving spot of light which moves across the screen in a series of parallel lines and from top to bottom in a time interval within the period of persistence of vision, in order to prevent flicker. Deflection of the beam (formed by the cathode 37 and the anode 38) in one direction is effected by the field between a pair of deflecting plates 39 supplied with voltage having a saw-tooth wave form. A second voltage having a similar wave form is also supplied to the deflecting plates 40 to effect deflection in the other direction. Any suitable apparatus such as that disclosed in United States Patent 1,613,954, January 11, 1927, to Knoop, may be used to produce the deflecting voltages. For the sake of simplicity, the sweep circuits have not been shown in the drawings. The deflecting voltages for the two cathode ray tubes 28 and 29 should preferably come from the same source or sources so that the beams of radiations produced by the respective fluorescent screens will be in synchronism with each other. The beams of radiations produced by the screens of these tubes 28 and 29 may be filtered by means of filters 34 so as to permit only radiations of the desired wave-length range to pass therethrough.

Inasmuch as the scanning tubes or cells $S_1$ and $S_2$ discharge in alternate image cycles, it is only necessary that the scanning beams from the fluorescent screens of the cathode ray tubes 28 and 29 function as such in alternate cycles, i. e., first one beam scans one tube and then this beam is shut off and the other beam scans the other tube. One method of cutting off the scanning beams supplied by the optical system including the cathode ray tubes 28 and 29 from the insulating plates 13 in alternate image cycles is to render the cathode ray tubes 28 and 29 inoperative during alternate image cycles. This may be accomplished conveniently by disconnecting the source supplying bias potential to the anodes of the respective cathode ray tubes during alternate scanning periods. A system more to be preferred, however, comprises a set of movable shutters or screens 30 and 31 to allow devices $S_1$ and $S_2$ to be scanned in alternate image cycles. The shutters 30 and 31 are integral parts of the control system.

These shutters 30 and 31 preferably consist of discs mounted on shaft 32 and driven in synchronism with each other and with a commutator 26 which, as described above, is also mounted on this shaft. For a detailed description of one of these shutters 30 or 31, reference will now be made to Fig. 4 which shows a two-sectored disc 81 having a hub 84 adapted to fit on shaft 32. The sector 82 is transparent to white light as well as to the radiations comprising the scanning beams. If ultra-violet radiations are used for scanning, the material of the sector 82 may be of fused quartz glass. Sector 83 may be of the same material as the sector 82 with opaque films covering its surfaces or it may be made entirely of an opaque substance. In order to provide a balanced disc, sectors 82 and 83 should be of substantially the same weight. The opaque sectors of the discs 30 and 31 are mounted on the shaft 32 so that they operate to cut off the beams from the fluorescent screens of the tubes 28 and 29, respectively, in alternate image cycles.

The sectored discs 30 and 31 also control another optical system which provides an electrical path from each photo-emissive layer 12 to the external circuit when the scanning tubes $S_1$ and $S_2$ are in their turn discharging the stored electrons. Photoelectric cells 41 and 42 are placed in this external circuit, these cells 41 and 42 having the function of valves. Placed so as to illuminate the cells 41 and 42 is an ordinary white light source 43 arranged within tube 44 so that its light is directed through lenses 45 and 46 onto cells 41 and 42. When light from the source 43 strikes one of these cells, the circuit from the photo-emissive layer 12 of the corresponding scanning tube to the external circuit, including the resistance 21, is completed. The rotary screens 30 and 31 are so arranged that they cut off the light from cells 41 and 42 in alternate image cycles, thus alternately connecting scanning tubes $S_1$ and $S_2$ to the external circuit. This use of a photoelectric commutator avoids the defects that would otherwise result from the presence of a mechanical commutator in the input circuit of the amplifier.

The operation of the system disclosed in Fig. 2 is as follows:

Radiations from a source (not shown) are reflected by the object O to the optical device 23, which divides the rays and permits half of them to be focussed on scanning tube $S_1$ by means of lens 24 and the other half to be focussed on scanning tube $S_2$ by means of lens 25. For the positions of the shutters 30 and 31 and of the commutator 26 shown in Fig. 2, the tube $S_1$ is storing charges and the tube $S_2$ is discharging its charges, and the shutters 30 and 31 are so arranged that for the beam of radiations from the fluorescent screen of the cathode ray tube 28 is cut off but the beam from the screen of the tube 29 is scanning the photo-emissive coating 14 of the storage member M in the tube $S_2$. The rotating shutter 30 is arranged so that it also allows the photo-emissive cell 41 to be operated because the transparent portion of this shutter is between the source 43 and the cell 41, thus closing this gap in the circuit from photo-emissive layer 12 of tube $S_2$ to the resistance 21 in the external circuit. As the opaque portion of the shutter 31 is between the source 43 and the photoelectric cell 42, a gap in the electrical circuit between member 12 of tube $S_1$ and the resistance 21 is made, which gap is represented by the non-operating photoelectric cell 42.

Considering first the scanning tube $S_1$, which is operating on a storing cycle, the positive terminal of the larger battery 27 is connected via the reversed smaller battery 49 and connection 50 to the conducting film 15 to impart a positive bias thereto with respect to the layer 12 which is equal to the potential of the larger battery 27 minus the potential drop across the battery 49. The photo-emissive layer 12 is connected to the negative terminal of the larger battery 27 through connection 51, contact 52, conducting segment 96 of commutator 26, contact 53, and connection 54. The radiations from the object O are thus projected onto the photo-emissive layer 12 which emits electrons corresponding to the lights and shades of the elemental areas of the field of view or object O, which, because of the positive charge on the conducting film 15, pass to the adjacent photo-emissive coating 14 of the plate 13 and are held there. The photo-emissive coating 14 has, before the electron flow starts, a potential which is neutral between the positive charge on film 15 and the negative charge on layer 12. Its polarity, however, is sufficiently positive with respect to the polarity of layer 12 so that electrons emitted by the member 12 are attracted to it. They are held on the coating because of the condenser action between the coating and the positively charged film 15 on the opposite surface of the insulating plate 13.

During this same cycle, the tube $S_2$ is discharging to the external circuit the charges which had been stored on the photo-emissive coating 14 in the preceding image cycle. In this tube, when the apparatus is in the position shown in Fig. 2, the photo-emissive layer 12 is made positive while the conducting film 15 is made negative so that the electrons stored in the preceding cycle on the photo-emissive coating 14 are caused to flow back to the elemental areas of the photo-emissive layer 12, to thereby control the flow of an image current to the external circuit, when the scanning beam passes over the corresponding elemental areas of the coating 13. The positive charge on the layer 12 is obtained by a connection from the positive terminal of battery 49 via the resistance 21, connection 59, photocell 41 (made conducting by source 43), and connection 56. The conducting film 15 is negatively charged by a connection to the negative terminal of the battery 49 through connections 59 and 58.

One cycle later finds the scanning tubes $S_1$ and $S_2$ performing functions respectively opposite to those performed when the apparatus was in the position shown in Fig. 2. The relative positions of the opaque portions of the discs 30 and 31 have now been reversed so that the tube $S_1$ receives radiations from the fluorescent screen of the cathode ray tube 28 while the radiations from the screen of the cathode ray tube 29 are cut off from the scanning tube $S_2$. The electrical circuit from resistance 21 to the member 12 of tube $S_1$, including connection 60, photoelectric cell 42, and connection 61 is completed because in this cycle the light from source 43 is unobstructed in its passage to the cell 42, but the circuit including the photoelectric cell 41 is now open as the light from the source 43 is cut off from cell 41 by the opaque section of the disc 30. The tube $S_1$ is now discharging an image current to the external circuit and the tube $S_2$ is storing charges on its photo-emissive surface 14 corresponding to the lights and shades of the object O. The photo-emissive layer 12 of the tube $S_1$ is positively charged to attract the electrons emitted from the coating 14 when it is scanned by the moving beam of radiations produced by the fluorescent screen of the cathode ray tube 28 cooperating with the lens system 35. Layer 12 is positively charged by virtue of its connection to the positive terminal of battery 49 through resistance 21, connection 60, photocell 42, connection 61, and connection 54. Conducting film 15 of the tube $S_1$ is negatively charged during this operating or image cycle by a direct connection to the negative terminal of battery 49.

The photo-emissive layer 12 of the tube $S_2$ is negatively charged with respect to its conducting film 15, being biased by a potential equal to the difference between the electromotive forces respectively produced by the oppositely connected batteries 27 and 49. Layer 12 is connected to the negative terminal of battery 27 via connection 56, contact 57, conducting segment 96 of commutator 26, contact 52, and connection 51. The positive connection is made from the positive terminal of battery 27 through battery 49 connected so as to oppose the potential of battery 27, connection 50, and connection 58 to the conducting film 15. As the beam of radiations from the fluorescent screen of cathode ray tube 29 is cut off from the tube $S_2$ during this cycle, the tube $S_2$ will store up charges in its photo-emissive coating 14 which will be held there by the positive potential applied to the conducting film 15.

By choosing proper voltages for the batteries 49 and 27, the potentials between the members 12 and 15 in the charging operation can be made less than, equal to, or greater than the potential between these same members when their respective scanning tubes are discharging. This advantage cannot be obtained where a single battery is used and its connections reversed in alternate cycles. Inasmuch as the discharge from any elemental area of the coating 14 occurs in a period of time which is only a minute fraction of the time used to store a charge on that elemental area, it may be desirable to have a larger difference of potential between the members 12 and 15 in the discharge cycle than in the storing cycle. This can, of course, be obtained with two batteries connected as shown in Fig. 2, the potential of the battery 49 being made larger than the difference between the potentials of batteries 27 and 49.

During alternate cycles, scanning tubes $S_1$ and $S_2$ will discharge an image current corresponding to the lights and shades of successive elemental areas of the object O to the external circuit including the resistance 21, where they will be raised to the desired power level by the device 22, which may comprise a multistage amplifier, and transmitted over the line L to a remote station including a receiver R. For line carrier or radio transmission, the amplified image current would be used to modulate a carrier current of the proper frequency.

Receiver R may include an amplifier in the case the image current is directly transmitted, or a demodulator and amplifier in case transmission is effected in accordance with line carrier or radio practice. It also includes a cathode ray discharge device 70 comprising a cathode 71 and an anode 72 for producing the cathode beam, two pairs of plates 73 and 74 for respectively effecting deflection of the beam in two directions at right angles to each other, a fluorescent screen 75 and a pair of control grids 76 and 77 connected by an external circuit 78 to which the image currents received over line L and amplified by the device 79 are supplied by means of a transformer 80. Deflecting voltages are applied between the pairs of plates 73 and 74 as in the case of the cathode ray tubes at the transmitter. The apparatus (not shown) for producing the deflecting voltages is preferably controlled by current of line scanning frequency received from the transmitting station. In this manner the cathode beam of the receiver 70 is deflected in synchronism and in phase with the deflection of the beams of the cathode ray discharge devices 28 and 29 used in the transmitter.

The cathode ray discharge device 70 operates in the following manner: The control electrodes or grids 76 and 77 are closely adjacent each other in a position between the anode 72 and the fluorescent screen 75 and comprise segments of a sphere, the centers of curvature of which are close to the centers of the deflecting fields produced by the plates 73 and 74. The grid 76 is maintained at substantially the same potential as the anode 72 and the signal potentials are applied to the grid 77 which may be negatively polarized with respect to the grid 76. The controlling grids 76 and 77, therefore, serve to define a very limited zone in which the signal potentials are effective for controlling the cathode beam, and this zone is substantially isolated from the equipotential section established between the anode circuit 72 and the grid 76, within which zone deflection of the beam is effected. In this manner deflection of the beam is controlled by the fields established between the pairs of plates 73 and 74 without being influenced by the signal potentials. The signal potentials operate to control the velocity or number of electrons constituting the beam and hence the intensity of the excitation of the fluorescent screen which determines the quality of the image produced without causing the direction of travel of the electrons to be varied. In other words, the two sets of elements for effectively controlling the deflection and intensity of the beam, each of which tends to interfere with the other and thereby cause loss of focus of the beam and distortion of the image, are so positioned and electrically controlled as to materially, if not completely, avoid such interference. For a more complete disclosure of the construction and method of operation of the image producing cathode ray device 70 briefly described above, reference may be made to Patent 2,155,192, issued April 18, 1939, to J. B. Johnson.

While a receiver of the cathode ray discharge type has been described, a glow lamp cooperating with a rotating disc having a spiral of apertures or any other well-known type of receiver could be used to reproduce the image. A satisfactory receiver of the glow discharge type is disclosed in United States Patent 1,728,122, September 10, 1929, to Horton.

Referring to Fig. 3, there is shown an enlarged perspective view of the assembly enclosed by the tube S, the glass portion being broken away. This assembly comprises a target or screen C comprising a transparent plate 11 of glass or other suitable material carrying a thin layer 12 of conductive photo-emissive material, such as, for example, one of the alkali metals. Spaced from the layer 12 by a very small distance, which may be approximately equal to the width of an elemental area of the image, is a storage member M comprising a very thin, non-conducting, photo-emissive coating 14 which has a negligible lateral conductivity and which may be, for example, of rubidium, applied in the form of a coating on one surface of a very thin transparent plate 13 which may be of mica or other transparent insulating material. Because of the high specific resistance of the mica and the thinness of the plate 13, a high capacity is obtained between the conducting film 15 and the coating 14 in which the charges may be stored. On the surface of the plate 13 remote from the layer 12 is a transparent conducting film which may be of silver. In some cases, the photo-emissive coating 14 may comprise minute globules. The external circuit is connected to the conductive layer 12 and the silver film 15. If ultra-violet rays are used for the scanning beam, the mica plate 13 may be coated with thin patches of a less sensitive metal such as magnesium (to take the place of the photo-emissive coating 14) and the lenses 35 should be of quartz.

Fig. 5 shows a high frequency arrangement for reversing the potentials applied to the members 12 and 15 of the scanning tube S, which may be similar to that used in Figs. 1 and 2. The locations of the object and the optical system supplying the scanning beam, with respect to the tube, are also similar to those shown in Fig. 1. A high frequency oscillator 90 supplies current to transformer 91, the secondary of which applies potentials to the elements 12 and 15 of scanning tube S through a circuit including a condenser 92. The polarities of the potentials applied to the members 12 and 15 reverse while the beam from the cathode ray tube 17 is passing over an elemental area. These rapid reversals of polarities cause the electrons emitted from the photo-emissive surface 12 to be stored on the photo-emissive coating 14 of the insulating plate 13 whenever the conducting film 15 is positive. Thus a charge is built up on the coating 14 by a succession of pulses rather than by a continuous flow as is the case in the arrangement shown in Fig. 1. The charge acquired by any elemental area does not return to the layer 12 until the scanning beam passes over that elemental area, when the discharge will occur in a sharp pulse from one elemental area of coating 14 to the corresponding elemental area of layer 12 whenever that member is negatively charged and the beam is scanning the elemental area in question. Thus, only the elemental area being scanned will be discharged, even though the potential on every elemental area is being reversed rapidly. For this reason, a large charge is stored in successive unit areas of the coating 14 which is released to the layer 12 and thence to the external circuit, including a resistance 21 and amplifier 22. By scanning the target or screen in a time interval within the period of persistence of vision, these discharges serve to control the supply of an image current, varying in amplitude in a manner corresponding to the tone values of the object O, to the external circuit. Between the resistance 21 and the amplifier 22 is a high frequency filter 93, adapted to cut off from the grid of the amplifier 22, and thereby prevent the application of, high frequency current components. Condenser 92 serves to prevent the image current from flowing back through the secondary of transformer 91. If additional stages of amplification are used, additional high frequency filters may be used to advantage. In the case of a two-stage amplifier, as shown in Fig. 5, an additional high frequency filter 95 is located between the first and second stages. As in Fig. 2, the transmitter is connected via a communicating medium L to a receiver R (not shown). A receiver of the type shown in Fig. 2 or any other suitable receiver may be used.

Fig. 6 shows diagrammatically the relation between the charges and discharges of the device shown in Fig. 5. The loops 100 above the base line represent charges and each loop is the summation of the charges from all of the elemental areas of the photo-emissive layer 12 whenever the conducting layer 15 is positive. No charges take place when the conducting layer 15 is negative but during each negative period, one elemental area is discharging, the amount of the discharge depending upon the tone value of the particular elemental area of the object. These discharges have been represented by dotted lines 101 below the base line. While the charging pulses are substantially similar to each other, the discharge pulses vary one from the other depending on the tone values of the corresponding elemental areas of the object. The envelope 102 is thus representative of the image or low frequency components of the current through the resistance 21. The high frequency components are blocked out by the filter 93. The frequency of reversal may be several times the frequency at which the elemental areas are scanned and the device still be operative, but the reversal frequency should be at least as high as the frequency at which the elemental areas are scanned in order to have a discharge from each elemental area.

Other changes may be made without departing from the spirit or principles of the invention as hereinbefore expressed, the scope of which is defined by the appended claims. In the claims, the expressions "light" or "light beam" are intended to include infra-red and ultra-violet rays as well as rays from the visible portion of the spectrum.

What is claimed is:

1. A method of effecting electro-optical scanning which comprises utilizing radiations corresponding to a complete field of view or subject to cause a photo-emissive material to emit electrons to a storage member, causing the emitted electrons to form a multiplicity of elemental charges on said storage member each charge corresponding to the light tone value of an elemental area of the field or subject, and causing the charges to be successively and in each instance substantially instantaneously dissipated in such a manner that groups of electrons are caused to successively return to said photo-emissive material to thereby control the production of an image current.

2. An electro-optical scanning device comprising a container enclosing a photo-emissive layer and an electron storage means, means for projecting radiations from a complete field of view or subject on said photo-emissive layer to cause the emission of electrons therefrom to said storage means, and means for causing electronic discharges corresponding to the tone values of the elemental areas of said field of view to occur in succession from said storage means to said layer to thereby produce an image current.

3. An electro-optical apparatus comprising means for emitting electrons corresponding to radiations received from an object or field of view, means for storing said electrons, means for scanning said storage means with a beam of radiations to cause a moving beam of electrons to be emitted therefrom, and means to cause said last-mentioned beam to be directed to said first-mentioned means.

4. An electro-optical apparatus comprising a target and a storage member, means for illuminating said target in accordance with the tone values of an object or field of view to thereby cause simultaneous electronic emission to said storage member from every illuminated elemental area of said target, and means for causing stored electrons to pass to said target elemental area by elemental area in succession to thereby produce an image current.

5. An electro-optical device comprising a target adapted to be illuminated by an image and a storage means, said target comprising a continuous transparent plate and a photo-emissive layer, and said storage means comprising a photo-emissive coating, a light transmitting continuous insulating layer and a semitransparent metallic layer.

6. An image current producing device comprising a container enclosing a photo-emissive layer and a means for storing electrons, means for creating a difference of potential between said layer and said storage means and means for later reversing the direction of slope of the potential gradient therebetween, means for activating said photo-emissive layer by radiations controlled by the tone values of a complete field of view or subject to cause the emission of electrons to said storage means when said storage means is positive with respect to said layer, and means for scanning said storage means with a beam of light when said layer is positive with respect to said storage means to thereby produce an image current.

7. An image current producing device comprising a container enclosing a photo-emissive layer and a means for storing electrons, means for creating a difference of potential between said layer and said storage means and means for later reversing the direction of slope of the potential gradient therebetween, means for activating said photo-emissive layer by radiations controlled by the tone values of a complete field of view or subject to cause the emission of electrons to said storage means when said storage means is positive with respect to said layer, and scanning means for causing electronic discharges from elemental areas of said storage means in succession to said layer when said layer is positive with respect to said storage means to thereby produce an image current, the said difference of potential being greater during the electronic discharge from the storage means than during the emission of electrons from the photo-emissive layer to the storage means.

8. An electro-optical system having a scanning device comprising a gas-tight container enclosing a transparent plate, one face of which carries a conductive photo-emissive layer, and a storage member comprising a transparent insulating plate provided with a photo-emissive coating on the face adjacent the first-mentioned plate and a conductive film on its other face, an external circuit connected between said photo-emissive layer and said conductive film, means for projecting an image of a field of view or subject on said photo-emissive layer to thereby activate it to emit electrons which are stored in said storage member, and means for causing a moving beam of light to scan successively the elemental areas of said storage member to thereby cause the emission of electrons to said photo-emissive layer and produce a flow of an image current through said external circuit.

9. An electro-optical system having a scanning means comprising a gas-tight container enclosing a target comprising a transparent plate carrying on one face a conductive photo-emissive layer, a storage member parallel to the target comprising a transparent insulating plate provided on its face adjacent the target with a photo-emissive coating and on its other face with a conductive film, an external circuit connected between said photo-emissive layer and said conductive film, means for oppositely polarizing said layer and said film, means for projecting radiations from a complete field of view or subject on said photo-emissive layer which is thereby activated to emit electrons which are stored in said storage member, means for reversing the polarities applied to said layer and said film, and means for causing a moving beam of radiations to scan successively the elemental areas of said storage member subsequent to said reversal and while said polarities are so reversed to cause the emission of electrons therefrom to the photo-emissive layer and produce a flow of image current through said external circuit.

10. An image current producing device comprising a container enclosing a photo-emissive layer and means for storing electrons, means for activating said photo-emissive layer by radiations controlled by the tone values of a complete field of view or subject to cause the emission of electrons to said storage means when said storage means is positively polarized with respect to said layer, means for scanning said storage member to cause electronic discharges from successively scanned elemental areas of said storage means to said photo-emissive layer when said storage means is negatively polarized with respect to said layer, and means for cyclically reversing the polarities of said photo-emissive layer and said storage means, said means having a frequency at least as great as the frequency at which the elemental areas are scanned.

11. An image current producing device comprising a container enclosing a photo-emissive layer and means for storing electrons, means for activating said photo-emissive layer by radiations controlled by the tone values of a complete field of view or subject to cause the emission of electrons to said storage means when said storage means is positively polarized with respect to said layer, means for scanning said storage member to cause electronic discharges from elemental areas of said storage means to said photo-emissive layer when said storage means is negatively polarized with respect to said layer, and means for cyclically reversing the relative potentials of said photo-emissive layer and said storage means at least once while said beam is scanning an elemental area of said storage means.

12. An image current producing apparatus including a plurality of devices each comprising a container enclosing a photo-emissive layer and means for storing electrons, means for activating the photo-emissive layer in each device by radiations corresponding to a complete field of view or subject to cause the emission of electrons to the storage means, and light beam scanning means for causing successive electronic discharges from elemental areas of said storage means to the corresponding elemental areas of said photo-emissive layer to produce image current, and means for causing the respective devices to control the production of image current during successive time intervals.

13. An image current producing apparatus including two devices each comprising a container enclosing a photo-emissive layer and means for storing electrons, an external circuit common to the two devices, means for polarizing the photo-emissive layer of each device with respect to its respective storage means, optical means for simultaneously and at all times directing radiations corresponding to a complete field of view or subject on the photo-emissive layer of each device to cause the emission of electrons to the storage means in each device when said storage means is positively polarized with respect to said photo-emissive layer, scanning means for causing electronic discharges from elemental areas of said storage means in each device to corresponding elemental areas of its respective photo-emissive layer when said layer becomes positively polarized with respect to said storage means, and means for cyclically reversing the polarities of the photo-emissive layer and the storage means of the respective devices to cause one device to store charges while the other device is discharging and thereby cause a substantially continuous flow of image current through said external circuit.

14. An image current producing apparatus comprising a plurality of cells, each cell comprising a gas-tight container enclosing a photo-emissive layer and means comprising a photo-emissive coating for storing electrons, an external circuit common to the cells, a controller for said cells comprising means for creating a difference of potential between the layer and the storage means in each of the cells, the polarities of the layer and storage means in one cell at any instant being respectively opposite to the polarities of the same members in the other cell, means for simultaneously producing moving beams of radiations for scanning the photo-emissive coatings of the respective cells and for causing one beam to scan the photo-emissive coating in one of the cells while preventing the other beam from scanning the photo-emissive coating in the other cell and means for connecting one cell to the external circuit while preventing the connection of the other thereto, and means for periodically reversing the operation of the means constituting said controller with respect to said cells.

15. The combination with a device having opposed photo-emissive surfaces, of means for simultaneously illuminating a plurality of elemental areas of one of said surfaces to cause emission of electrons to the other, and means including apparatus for subsequently illuminating a plurality of elemental areas of said other surface in succession to cause emission to said first surface.

16. The combination with an insulating plate, of a layer of photo-emissive material on one surface thereof and an electrically conductive layer on the other face thereof, means for generating a beam of electrons, means for positively charging said conductive layer with respect to said beam generating means, means for directing electrons from said beam generating means through space to said photo-emissive layer where they will be held by said positive charge and temporarily stored, and means for removing said positive charge and causing light to scan said photo-emissive material to set up an electronic discharge from each elemental area thereof in succession at least equal in amount to the electronic charge stored thereon.

17. The combination with a device having opposed photo-emissive surfaces, means for causing light to impinge upon one of said surfaces while the second is unilluminated to cause an emission of electrons from the former to the latter, and means including apparatus for subsequently causing a beam of light to scan the second of said surfaces element by element to cause an emission of electrons from said second surface to said first surface.

18. An electro-optical apparatus comprising means for emitting electrons corresponding to radiations received from an object or field of view, means separated from said emitting means for storing said electrons, and means for scanning said storage means with a beam of light to cause a moving beam of electrons to be emitted from the side of said storage means opposite to that on which the light beam is received, said storage means comprising a light conducting member through which the scanning light passes.

19. A television transmitting device comprising a layer of photo-emissive material, a second layer of photo-emissive material disposed in generally parallel relation to and adjacent said first layer, whereby said layers are separated only by free space, and means including apparatus for scanning said second layer with a beam of light for forming a beam of electrons corresponding to said beam of light and causing the first photo-emissive layer to be scanned by said beam of electrons.

20. A television transmitting device comprising a layer of photo-emissive material, a second layer of photo-emissive material disposed in generally parallel relation to said first layer, means, including apparatus for scanning said second member with a beam of light, for forming a beam of electrons corresponding to said beam of light and causing the first photo-emissive layer to be scanned by said beam of electrons, and means for interrupting the scanning of said first photo-emissive layer by said beam of electrons at least once while said beam moves a distance equal to its cross-section.

21. A television transmitting device comprising a layer of photo-emissive material, a second layer of photo-emissive material disposed in generally parallel relation to said first layer, a conductive coating in capacitive relation with said photo-emissive member, means for scanning said second member with a beam of light whereby a beam of electrons corresponding to said beam of light is caused to scan the first photo-emissive layer, and means for interrupting the scanning of said first photo-emissive layer by said beam of electrons at least once while said beam moves a distance equal to its cross-section, said last-mentioned means comprising a high frequency source of oscillations applied between said first photo-emissive member and said conductive coating.

22. A television transmitting device comprising a container enclosing two parallel opposed plates, the first of said plates comprising an insulating member having a photo-emissive surface thereon and the second of said plates comprising an insulating member having a photo-emissive surface on the side thereof adjacent the photo-emissive surface on said first plate and a conductive coating on the opposite surface thereof, means for applying radiations from an object or field of view simultaneously to all the elemental areas of the photo-emissive layer of said first plate through the insulating member of that plate, means for scanning the photo-emissive layer of said second plate through said conductive coating and the insulating member of said second plate with a beam of light to generate thereby a beam of electrons which scans in turn the photo-emissive layer of said first plate, means for applying a source of oscillations between said conducting coating and said photo-emissive layer of said first plate, the frequency of said source being at least equal to the number of elemental areas into which said photo-emissive layer is divided by the scanning of said beam of electrons.

23. A television transmission device comprising a layer of photo-emissive material, means for applying radiations from an object or field of view simultaneously to all of the elemental areas of said photo-emissive material, means for generating a moving beam of electrons to scan said photo-emissive material, a high frequency oscillator, and means for connecting said oscillator between said photo-emissive layer and said beam generating means.

24. In combination, a first electron emitting element, a second electron emitting element spaced from said first element, a source of radiations, means for applying a beam of radiations therefrom to said first element to cause electrons to be emitted to said second element, a second source of radiations, means for intermittently applying a beam of radiations therefrom to said second element, and means for applying an alternating current potential across said elements of such frequency and phase that during each half cycle which makes said first element positive with respect to said second element said beam from said second source impinges upon said second element.

FRANK GRAY.